US009695584B2

(12) United States Patent
Moran et al.

(10) Patent No.: US 9,695,584 B2
(45) Date of Patent: Jul. 4, 2017

(54) INCLINED PLATES FOR CSO

(71) Applicant: Fresh Creek Technologies, Inc., Cedar Grove, NJ (US)

(72) Inventors: Dennis R. Moran, Caldwell, NJ (US); Walter C. Trnka, Warrington, PA (US); Hans de Bruijn, Lancaster, PA (US)

(73) Assignee: Fresh Creek Technologies, Inc., Cedar Grove, NJ (US)

( * ) Notice: Subject to any disclaimer, the term of this patent is extended or adjusted under 35 U.S.C. 154(b) by 323 days.

(21) Appl. No.: 14/062,700

(22) Filed: Oct. 24, 2013

(65) Prior Publication Data

US 2014/0110348 A1    Apr. 24, 2014

Related U.S. Application Data

(60) Provisional application No. 61/718,083, filed on Oct. 24, 2012.

(51) Int. Cl.
*E03F 1/00* (2006.01)
*B01D 21/00* (2006.01)
(Continued)

(52) U.S. Cl.
CPC .......... *E03F 1/00* (2013.01); *B01D 21/0045* (2013.01); *B01D 21/0051* (2013.01); *E03F 5/16* (2013.01);
(Continued)

(58) Field of Classification Search
CPC .............. B01D 21/006; B01D 21/0039; B01D 21/0042; B01D 21/0045; B01D 21/0015;
(Continued)

(56) References Cited

U.S. PATENT DOCUMENTS 3,706,384 A    12/1972  Weijman-Hane
4,957,628 A *  9/1990  Schulz ........................ 210/519
(Continued)

FOREIGN PATENT DOCUMENTS

FR        2536739 A1 *  6/1984  ............. B01D 17/00

OTHER PUBLICATIONS

English translation of FR 2536739 A1, machine English translation of FR 2536739 A1 Jun. 1984 (obtained from EPO at www.espacenet.com Mar. 2017).*

*Primary Examiner* — Lucas Stelling
*Assistant Examiner* — Angel Olivera
(74) *Attorney, Agent, or Firm* — Husch Blackwell LLP; Edward D. Manzo; George S. Pavlik (57) ABSTRACT

This device serves to improve water quality under gravity flow conditions. The water quality treatment device traps floating debris with replaceable netting, it contains oil spills and settles sediment in self-cleaning settling cells above a collection bunker inside a chamber. The device directs the water below the inclined cells, through the inclined cells, or over the inclined cells, depending on the inflow intensity. All inflowing water enters the net cavity and the net is supported by the inclined cell assembly. The pollutant collection surfaces are overlapping each other and aligned with the water flow direction. A hinged baffle with orifices controls the flow rate through the inclined cells. The netting is replaceable when filled with debris through an access opening in the ceiling of the chamber. The sediment bunker is cleaned through access openings in the ceiling from the chamber inflow side and the exit side.

23 Claims, 6 Drawing Sheets

(51) Int. Cl.
    *E02B 5/08* (2006.01)
    *E03F 5/16* (2006.01)
(52) U.S. Cl.
    CPC ........ *B01D 21/006* (2013.01); *B01D 21/0039* (2013.01); *B01D 21/0087* (2013.01); *E02B 5/085* (2013.01)
(58) Field of Classification Search
    CPC B01D 21/0072; B01D 21/0087; B01D 21/02; B01D 21/2405; B01D 21/307; B01D 2221/12; C02F 1/40; C02F 9/00; C02F 2103/001; C02F 2103/002; C02F 2103/005; E02B 5/16; E02B 5/085; E03F 1/00; E03F 5/16; E03F 1/005; E03F 5/10; E03F 5/14
    See application file for complete search history.

(56) References Cited

U.S. PATENT DOCUMENTS

| | | |
|---|---|---|
| 5,562,819 A | 10/1996 | Turner, Jr. et al. |
| 6,676,832 B2 | 1/2004 | de Bruijn |
| 2007/0095749 A1* | 5/2007 | Komatsu ................ 210/513 |
| 2009/0032448 A1* | 2/2009 | Kolb ...................... 210/87 |

* cited by examiner

INCLINED PLATES FOR CSO

CROSS-REFERENCES TO RELATED APPLICATION

This application claims priority to U.S. Provisional Patent Application No. 61/718,083, filed on Oct. 24, 2012, entitled Inclined Plates For CSO, the entire contents of which is incorporated herein by this reference.

FIELD OF INVENTION

A water quality treatment device and in particular a device for cleaning storm water that traps debris in storm water with replaceable netting while containing oil spills and settling sediment in self-cleaning settling lamellae or cells above a collection bunker inside a chamber.

BACKGROUND OF THE INVENTION

U.S. Pat. No. 3,706,384 (384 patent) in claim 1 teaches the flow distribution through a plurality of inclined plates, lamellae or cells in parallel to each other by means of entering the water into the lowermost side of the plates, lamellae or cells and discharging the water at the uppermost portion of the inclined plates, lamellae or cells. The '384 patent teaches the extension of the lamellae or cells to limit horizontal flow across the inclined lamellae or cells, U.S. Pat. No. 6,676,832 ('832 patent) teaches the use of inclined lamellae among other structural features including a dual chamber configuration for the treatment of surface water run-off from a storm event.

U.S. Pat. No. 5,562,819 discloses a net to trap floatable debris matter from flowing water in a subterranean chamber having an inlet and an outlet for connection to an underground conduit such as a sewer or storm drain conduit. The apparatus further includes a sensing system for detecting and signaling when the net is full of debris. A multi-bag or netting system is further disclosed in which at least two nets or bags are in parallel such that one net may accommodate overflow when the other net or bag is being serviced to remove the trash from the apparatus. Some form of this disclosed apparatus would reduce the collection of the solids entry openings that lead to the settling surfaces of other device downstream from it.

Provisional patent application 61/603,393, (Confirmation No. 2368), filing date Feb. 27, 2012, discloses an arrangement of netting and inclined lamellae or cells that reverses the flow direction through the inclined cells from entry at the lower most section to the uppermost section of the inclined cells and discharges through dedicated orifices instead of over a weir.

More or less the above referenced prior art patents deal with the treatment of water in order to physically remove solids and/or trash from the inflow to release water for further treatment including filtering action or disinfection action, desalination action or biological media filters or surface filtration to remove dissolved solids, disinfect or otherwise improve the purity of the water. The means of solids removal is intended to be passive and entirely dependent on the gravity induced flow of the water through the apparatus. The dynamic forces are generated by the flow of the water either indirectly or directly aided by the force of gravity.

In the USA, surface water run-off quality is regulated by the Clean Water Act and affects the construction cost of any site improvement for which a "Storm water Permit" is required from the EPA. When it rains the natural terrain contours and area generate a flow volume and a flow intensity or a drain rate. The water flows to the passive water quality treatment device which in turn discharges to lower lying receiving waters, filters, basins, lakes, etc. Often the water treatment device must be located in a limited area because of the right of way conditions. Collection surfaces of the device are responsible for the pollutant separation from the water and in terms of removal efficiency; a device reaches high efficiency when more collection area can be placed above a given footprint.

Furthermore, it is cost efficient to use hydraulic performance indicators that promote low Reynolds Numbers which indicate laminar flow in a flow conduit and uninterrupted settling. It is also important to reduce device depth since excavation affects installation cost exponentially, especially in highly populated regions with high water tables, which is near the water edge and shore lines.

Functionally, it is important to reduce the water turbulence and head loss between the device inflow and outflow conduits. It would be very beneficial to have a device that enhances these efficiency concerns for the purification of drainage water in one self-contained device.

SUMMARY OF THE INVENTION

The present invention is a self-contained water purification unit or device. The device scrubs storm water by trapping the floating and other debris in storm water with replaceable netting while containing oil spills and settling out of sediment in self-cleaning settling lamellae or cells above a collection bunker inside a chamber.

Bottom, side and ceiling walls form the chamber. The chamber is generally a rectangular box with internal components that are strategically located to receive the inflow and outflow of the storm water or surface water. At least one sidewall contains an inflow opening and one sidewall has an outflow opening. The ceiling may have an inlet grate for a single surface water inlet point or multiple access openings. The water surface is stationary and assumes the elevation of the outflow or exit pipe invert, except when flow enters the device through the inflow openings. The preferred embodiment of the device is an inline structure with a pipe entering and departing from opposite sidewalls, but other arrangements are able to be constructed where at least three walls contain inlet pipe openings and the ceiling contains an inlet grate to the interior of the chamber and one wall contains the outflow or exit pipe.

The storm or surface water enters the chamber and flows into a net cavity of a net bag or netting. The net cavity and net surface respectively function as retention bag for trash solids and a release surface with openings for trashless passing of the water. The netting surface openings can be changed to target specific size solids for detention and removal from the device. The net cavity may contain sorption socks or blankets which absorb oil sheen from the water surface, but the socks or blankets are retained by the netting bag to prevent release through the outflow or exit pipe. The netting or net bag is supported by a grating surface and/or by the top of inclined lamellae or cells and extends across a top surface of the inclined lamellae or cells to about six inches from a vertical overflow.

The chamber contains the inclined cells or lamellae between the inlet pipe and outlet pipe and water flows from the inlet pipe under the inclined cells and an orifice closure baffle up in to an effluent duct and the out the exit or outflow pipe. The water follows an U-shaped flow pattern during dry weather flow events and gently flows above the collected sediment that rests on the bottom wall of the chamber. The vertical inflow duct near the inflow pipe allows for floatation of oil, because the top of the inclined cells is suspended slightly above the invert elevation of the exit or outflow pipe. This is the top of the oil baffle wall, or dry weather flow weir The top of the cells run parallel to the flow of perpendicular to the weir wall. This elevation is also known as the dry weather flow weir elevation.

A water purifying chamber comprises a first chamber enclosure with a bottom, top and sidewalls; a water inlet permitting water to flow into the first chamber from a water source; a water exit permitting water to flow out of the first chamber no higher than the water inlet; a second chamber within the bottom portion of the first chamber where the entire second chamber is accessible from the water inlet across to the water exit; a ribbed inclined cell separator located between the water inlet and the water exist wherein a top surface of the cell separator is level with the inverts of the inlet and exit and wherein a bottom surface of the cell separator is adjacent the second chamber to deposit a suspended sediment in the water flow on the bottom wall; a net at the water inlet to receive all inflowing water substantially supported by the top surface of the ribbed inclined cell separator whereby the water can freely flow below and over the top surface of the inclined cell separator; an elevated primary weir above the top surface of the inclined cell separator but below a top of a secondary weir to split the inflowing water below the primary weir and over the primary weir into the ribbed inclined cell separator wherein the elevated secondary weir is above the primary weir to split the inflowing water into the ribbed inclined cell separator and over the secondary weir to an exit pipe at the water exit; and a hinged orifice baffle below the secondary weir to control the water flow below the ribbed inclined cell separator and the water flow through the ribbed inclined cell separator.

When the flow into the chamber intensifies during a high level storm event, the water level will rise and crest the dry weather flow weir. This weir is strategically located at an elevation to encourage the first flush flow through the inclined lamellae or cells. By approximation of the cresting portion of the water flow, the device will preserve the surface loading necessary to remove sediment particle sizes to meet the water quality standard of a given EPA rule. This cresting portion is able to reach the elevation of the overflow weir and crest this second weir until the water elevation exceeds the ceiling elevation. Effectively the water column first flows through the net cavity to remove the floatables that exceed the predetermined net opening size. Then the water column is stratified in one to three layers depending on the flow intensity.

During a dry weather water flow condition, there is a bottom layer of the water column that flows below the inclined cells. This water flow occurs when there is no rain event, but there is an irrigation run-off, car wash-water or liquid spills from accidents that drain into the device. This normal water flow exerts a minimal pressure on a hinged orifice baffle and does not facilitate closure thereof. Oil now floats in the inflow duct or inlet pipe and sediment within the water settles on the bottom wall of the chamber.

At a water quality flow an intermediate layer of the water column flows through the inclined lamellae or cells. This type of water flow occurs in about 90% of all water flow events in a device life-cycle. The water quality flow follows the inclined lamellae or cell ducts and exits at the bottom of the cells but then turns towards the orifice openings in the hinged baffle. However the water flow through the inflow duct or pipe and inclined cells intensifies and starts to exert exceeding pressure on the hinged orifice baffle. Yet the largest portion of the water flow travels through the inclined cells where it is exposed to a settling are and separation of sediment is facilitated.

The settled sediment continues to slide to the edge of each cell and drops off in to a sediment bunker cavity where it continues to settle to the bottom wall of the chamber. The success of continued settling of sediment that conies from the inclined cells and the prevention of wash-out requires the Q/A in the sediment bunker to be less than the Q/A in the inclined cells.

Washout of the collected sediment on the bottom wall must be avoided for the proper operation of the device or apparatus. The design goal is to insure the surface loading during dry weather flow is less than the surface loading for the water quality flow through the inclined cells. Therefore, the following equation is applicable:

$$Q_{wq} \cdot A_{ic}^{-1} > Q_{dw} \cdot A_{cb}^{-1}$$

$Q_{wq}$=Water Quality flow in gpm
$A_{ic}$=horizontally projected settling area of the parallel operating inclined cells in $Ft^2$
$Q_{dw}$=dzy weather flow in gpm
$A_{cb}$=chamber bottom area in $Ft^2$ The treated water escapes through the orifices and the remaining surface of the hinged baffle receives increasing pressure with the increasing water flow until it closes against the exit wall. The closed orifice baffle and the restricted water flow through the orifices causes back pressure that encourages the water in front of the overflow weir to rise above the overflow weir. The elevation of the overflow weir is critically dependent on the effluent pipe connection and size and the water quality design flow and the desired removal of sediment by the inclined cells.

During an Excess Water Flow, top layer of the water column overflows the effluent weir. In storm water quality treatment this overflow occurs infrequent at a rate of about 10% of all flow events in a lifecycle. During a water overflow condition the top layer of the water column contains the least sediment and the bottom layers the most. Although the surface loading by the inclined cells is higher than for the water quality flow they still facilitate settling of larger than normal solid particles.

The present invention utilizes inclined cells that enhance the removal efficiency by arranging the components in such a way that the hydraulic environment and gravity on suspended solids in the water flow is improved over prior art devices.

The lamellae and cells in prior art devices were parallel inclined plates and end closures to form the inclined cells. In present invention, the direction of water flow direction in the inclined cells is reversed when compared to prior art inclined cells where the settling action is used to separate particles that are denser than water. The reversal is causing con-current settling because the direction of water flow is substantially equal to the settling direction of the particle. Diagram 1 shows the apparent benefit because the water velocity vector and settling- and self-cleaning vector of the sediment point to the same direction. Diagram 2 shows the counter current condition in prior art, causing a shearing condition between the water vector and the sediment vector. The shear force induces turbulence and re-suspension of the sediment which is detrimental to the targeted separation goal.

Tills invention also discloses the use of parallel vertical dividers to improve full exposure of the water to the plate floor and avoid short circuiting of the water flow from the entry point to the exit orifice.

By comparison, it stands that the Reynolds number of an equal length cell at equal flow without ribs has a Reynolds number of 364 and the Reynolds number of ribbed cells is 244. Laminar water flow occurs when this number is below 400.

Theoretically, the Reynolds number could be balanced by increasing the flow rate by 48.8% in the ribbed cells. Prior art teaches the discharge of cleansed water at the top of the cell and sediment at the bottom of the cell. The new con-current flow pattern must deal with this and the method is shown in drawing 1 and drawing 2. The ribbed cells in drawing 1 are overlapped as shown in drawing 2) view A. The water flows parallel to the floor and ribs of the cell and reaches the bottom and turns towards the orifice openings in the hinged orifice baffle. The triangular extension provides a continuous path for the sediment to slide towards the sediment bunker. The vertical ribs act like flow separators inside the cell section but in the triangular zone the ribs are approximately 25% of the rib height and protect the sediment from being in the flow path of the cleansed water which now flows perpendicular to the ribs towards the orifice openings. This innovation preserves mixing of the cleansed water with the settled sediment when the two streams change directions and would otherwise re-suspend the sediment as it departs from multiple parallel overlapping sedimentation cells to a singular conduit leading to the orifices. The design takes advantage of the gravity induced stratification of the water and the sediment. The lighter water flows near the cell ceiling and the sediment slides on the cell floor. The change in direction of the ceiling water minimally affects the continuation of the sliding sediment.

Because of the ribbed cells the traditional length to width ratio of about 2 to 1 is maintained with shorter individual cells. The prior art U.S. Pat. No. 6,676,832 has a width of 30 inch and length of 53.625 inch. This invention has a width between the ribs of about 3.84 inches and permits the cell length to be reduced, while maintaining equal length to width ration. E.g. a length of 6.86 inch would balance the ratio, a saving of approximately 87%. This design feature therefore permits the vertical height of the inclined cells to be less than used in prior art which increases the passive storage volume of collected sediment while maintaining the same clearance between the cells and the sediment This construction of the cells reduces the depth of the device and reduces the device cost, excavation and dewatering costs.

The ribbed cells also provide intermediate support to the cell floor and ceiling which permits larger spans across the ribs without sacrificing the functionality of the inclined cells. The length of the cell assembly that runs parallel to the in- and outflow axis permits a matching net length and net length provides proportional net flow through area which extends its replacement life-cycle.

Absent any flow and a properly maintained sediment bed, the hinged orifice baffle suspends vertically from the hinge and is close to neutrally buoyant to allow clay like sediment to slide off the effluent side surface. A fixed baffle would collect vast amounts of sediment and flow would seek the path of least resistance around the baffle edges. The hinged baffle provides access for vacuum equipment and personnel access to the chamber bottom. The orifices in the baffle are essential to substantially control the flow through the inclined cells. The closure of the baffle and the overflow weir wall leaves no other option for the water to flow, but through the orifices. This is a critical design goal and targets the Water quality flow (Wq). It is the orifice (size, shape and number), and the water elevation difference before and after the overflow weir baffle, that controls the rate of flow through the orifices according to the following formula:

$$Wq = n \cdot \mu \cdot A \cdot (2g \cdot h)^{-1/2}$$

Where:
n=number of orifices
μ=the shape factor
A=Orifice Area
g=gravitational acceleration
h=pressure head

BRIEF DESCRIPTION OF THE DRAWINGS

Embodiments of the present disclosure are described by way of following drawings pointing out the various details to the invention. The main features and advantages of the present disclosure will be better understood with the following descriptions, claims, and drawings, where:

DETAILED DESCRIPTION

While this invention is susceptible of embodiments in many different shape and size, the present invention is shown and described in the attached drawings.

The purification goal of the inclined cells is to remove as much sediment by means of exposure of the flowing water to settling area provided by the cells. This creates a condition where the relative movement of the settling particle and the encapsulating water separate. The water and the particle move "En Masse" as a closed cell and only the density difference facilitates relocation of the particle within the cell. There must be equality of this condition throughout the inclined cell settling device to preserve the settling performance and repeatability of the performance. By maintaining a constant pressure head and placing orifices across the length of the hinged baffle and shaping matching the flow path length of all cells to its neighboring cells from the crest point of the dry-weather flow weir to the orifice, the Q/A relationship is equal constant for all exposed cell area. With the matching Q/A value it is consistently possible to find the maximum particle size that will not exit the device and predict the purity of the water for a surface overflow rate in gallons per minute per square foot (gpm/ft$^2$) at specific water temperatures and particle densities and particle shape characteristics.

This invention is more efficient and cost effective than prior art, because netting overlaps the settling cells, in turn the settling cells overlap themselves, the cells have a relatively low Reynolds number, the cells have a concurrent settling feature, where distribution flows are equalized with an orifices in a closure baffle and constant head loss, and settled sediment and purified water is separated into two distinct flow regimes in a relatively shallow chamber assembly with relatively small foot print.

This invention reduces the system footprint by 50% compared to an independent netting chamber followed by sedimentation chamber. This invention will be able to increase flow capacity to about 150% of counter current inclined cell devices while reducing by 25% the required device depth. Given the general rule that excavation affects cost to the square of the excavation depth, the innovation promises to substantially improve the way storm water is purified and deliver several cost reducing features.

Figure 1:
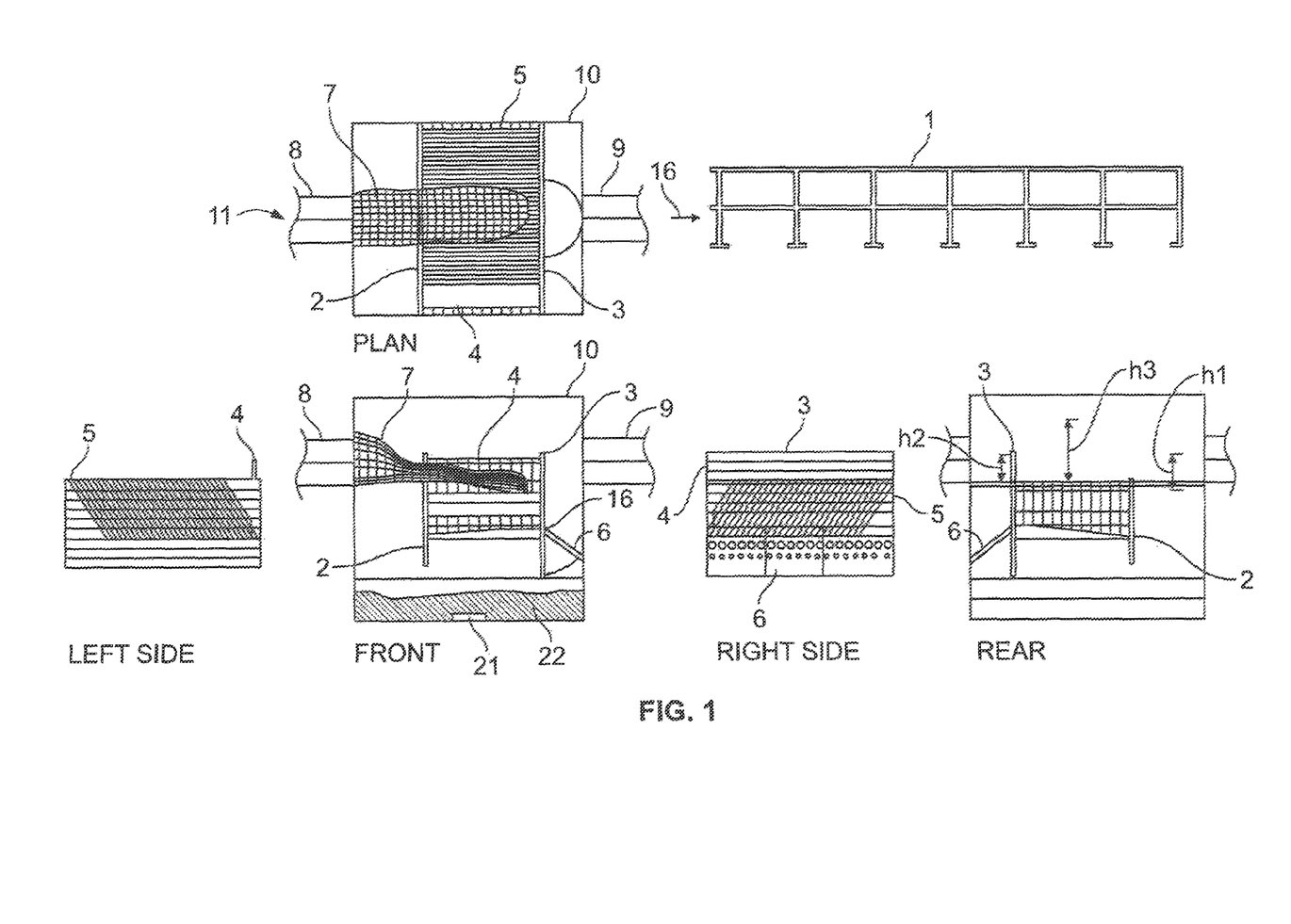
FIG. 1 shows plan, front, rear, left side and right side of the chamber components of the water purifying invention.
Figure 2:
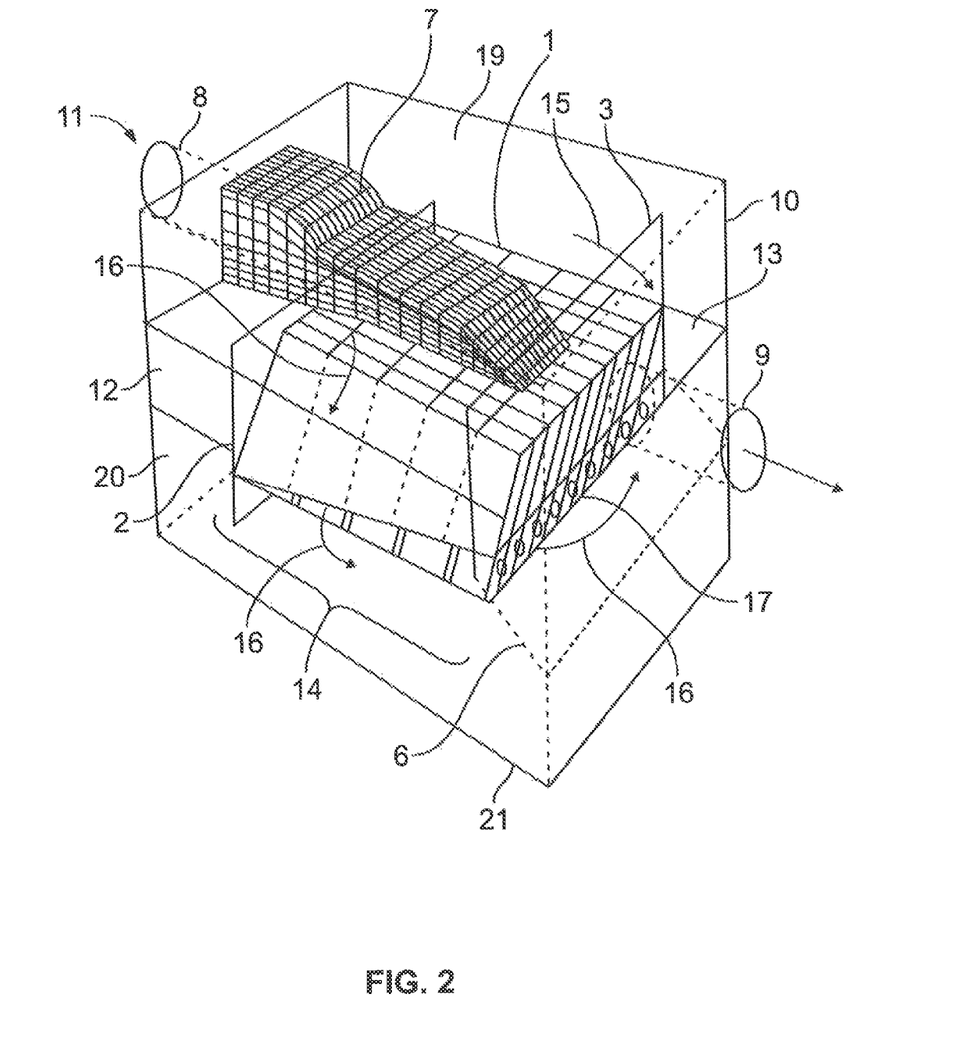
FIG. 2 shows a perspective of the invention of FIG. 1.

FIG. 1 and FIG. 2 is the component assembly of the preferred embodiment inside an enclosure chamber 10 with entry 8 and exit 9 pipes on opposite ends Ceiling 19 is near the finished grade elevation and has access openings above the dry weather flow influent duct 20 where oil 12 is collected in front of baffle 2.

Above duct 13 ceiling 19 has an access opening also. It is however possible to provide multiple openings in the ceiling to reach areas above the cell assembly 1. Bottom 21 collects all sediment from flow 14 and 16. Item 7 is a net that completely or partially covers the inserted inclined cell separator and this net passes all influent water.

The preferred embodiment of the insert is extruded: fiberglass, item 1, which is reinforced decking from the commercial market, but any configuration of the ribbed plates, fabricated from metal or fiberglass can be used. Item 2 is a vertical baffle that facilitates under and over flow of influent water 11, but also detains oil 12 that stratifies in front Inclined cells item 1, connect to the back of plate 2. Item 3 is a vertical baffle that facilitates under and over flow but has inclined cells mounted to the front and the vertical baffle has an effluent duct space 13 between the back of 3 and the effluent wall that contains pipe 9.

The relative size and position of 1 and 2 affects distance h1, h2, and h3. Dimension h1 affects the degree of flow 14 directed below item 1 and 2, whereas h2 affects the flow 15 over item 3 and the flow 16 through items 1. In water quality treatment the goal is to expose the water quality flow to as much settling surface area as necessary to settle the desired particulates.

Intercepting oil 12 prior to settling is desired and the dimensions h1 and item 2 are affecting this oil interception. The size of h1 and h2 facilitates flow 14 below item 2, as well as flow 16 through the inclined cells item 1 and flow 15 over Item 3. Dimensions h3 and h2 facilitate the by-pass of flow 15 in excess of water quality flow and is permitted to exit untreated by the settling surfaces.

Item 4 and 5 are stiffeners to provide structural integrity to the assembly. During "No-flow" conditions Item 6, with hinge 18 suspend the baffle with orifices 17 in a virtually vertical position and provides maintenance access and flow opportunity below item 1, 2 and 3.

During flow conditions Item 6 closes due to flow pressure and facilitates flow through the orifices and water quality flow over top of item 2 and through items 1. As flow intensity increases the water level will rise to dimension h3 and dedicate the lower portion of the water column to treatment by item 1, but the top portion of the water column will exit over top of item 3 and only receives treatment from item 7.

This arrangement of components will avoid wash-out of previously settled sediment 22 on the bottom 21 of the enclosure chamber. Item 6 has orifices 17 and the size, number and shape of these orifices affects the rate of flow through the orifices. With respect to water quality flow 16, it is the combination and physical dimensions of h2 and orifice size and number that affect the flow rate that will be exposed to the settling surface of item 1.

Figure 3:
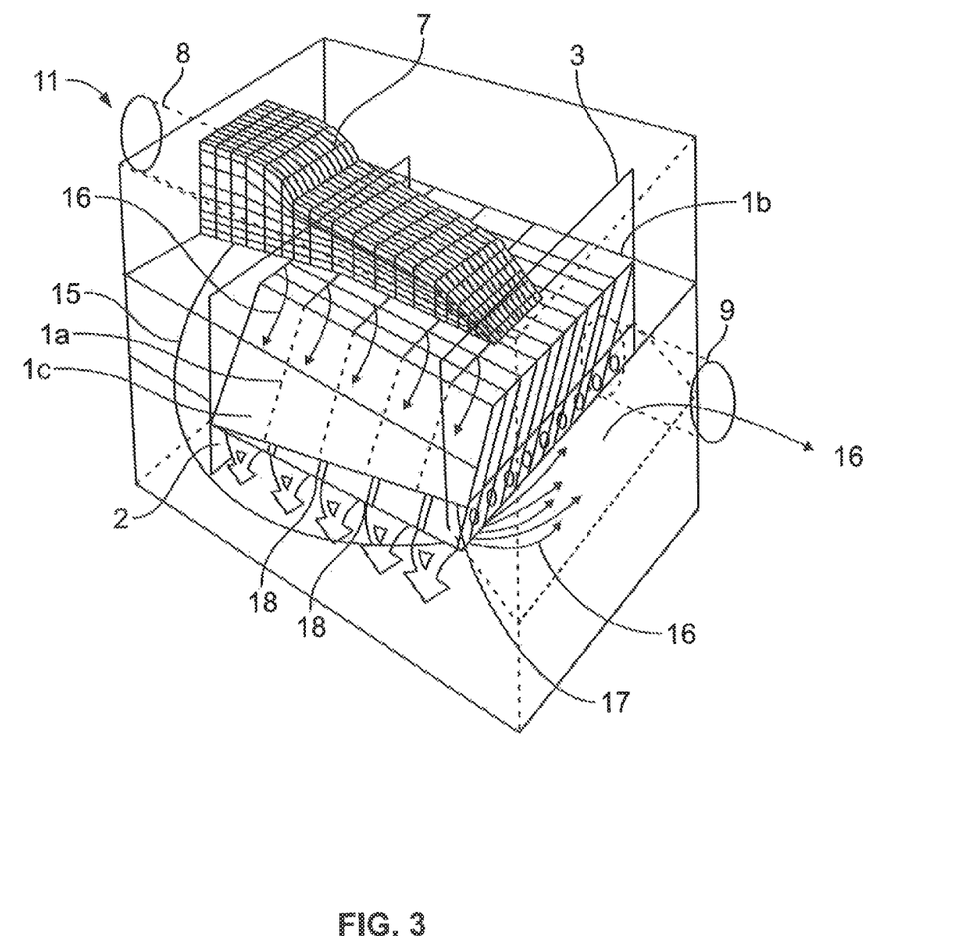
FIG. 3 shows a perspective of the invention with the flow of sediment and cleansed water designated according to the invention of FIG. 1.
Figure 4:
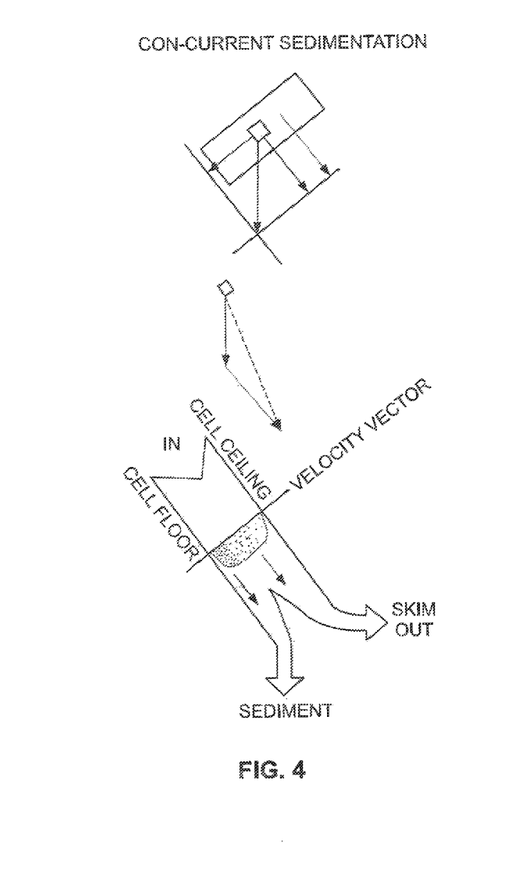
FIG. 4 shows the con-current flow of sediment and water through the cells of the present invention of FIG. 1.
Figure 5:
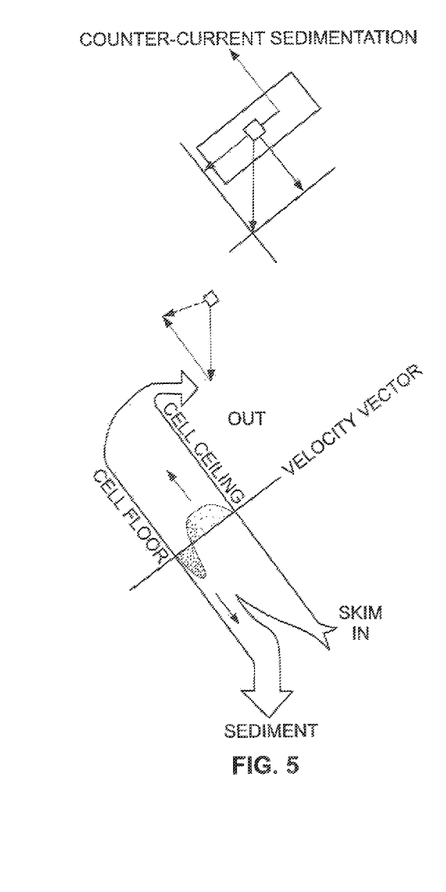
FIG. 5 shows the counter-current flow of the prior art contrasting the con-current flow of sediment and water through the cells of the present invention of FIG. 1.
Figure 6:
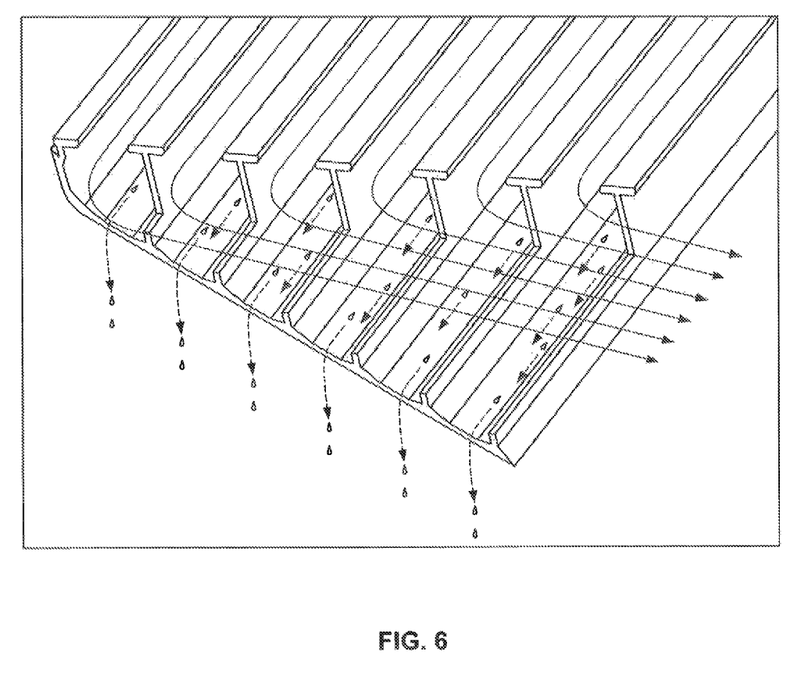
FIG. 6. shows a cell with the ribbed construction with the sediment sliding of the bottom of the cell and the water flowing perpendicular to the ribs in the cell according to the present invention of FIG. 1.
Figure 7:
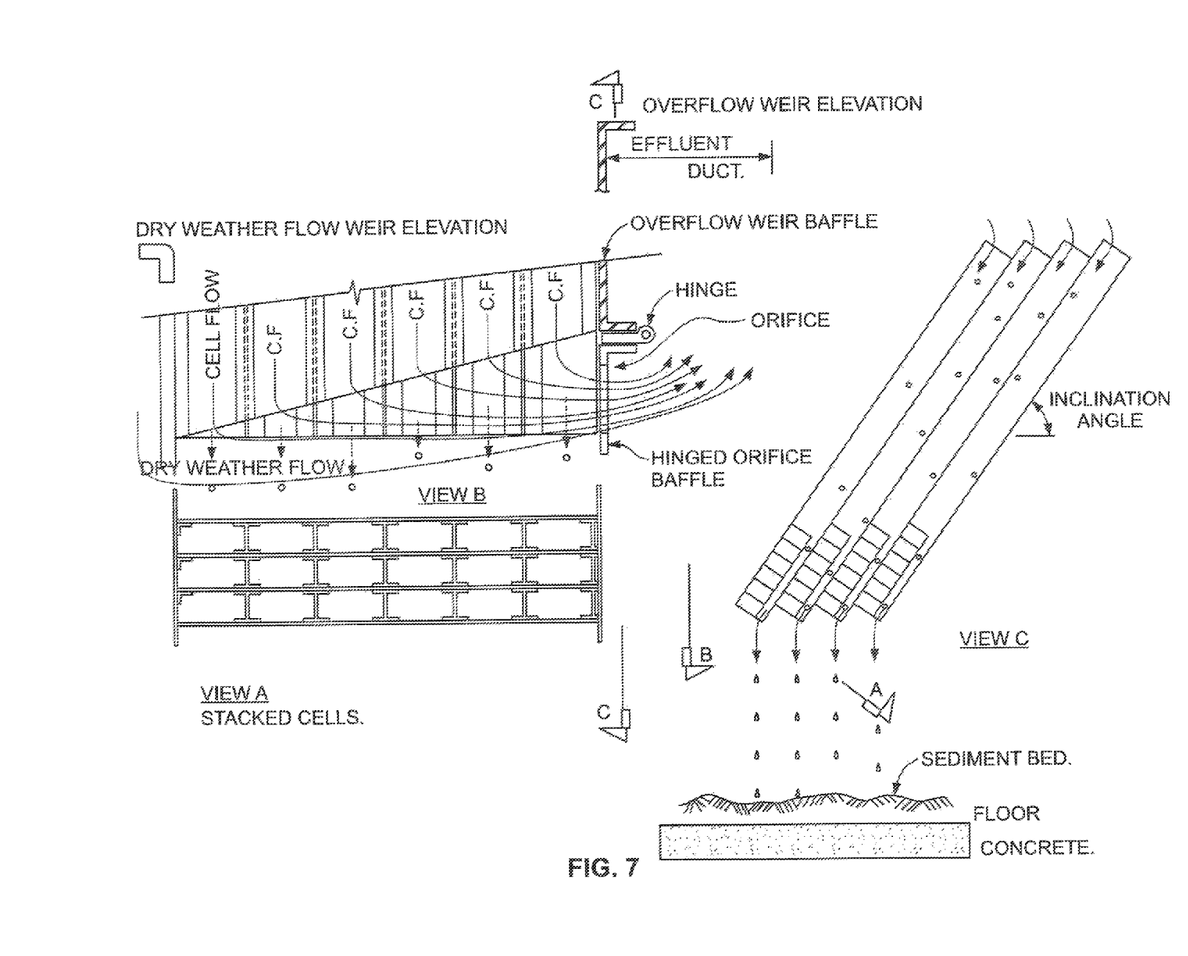
FIG. 7. Shows the path of the cleansed water and sediment passing concurrent through the cells in the present invention of FIG. 1.

FIG. 3 shows the specific design of the flow 11 entering the chamber through inflow pipe 8. The majority of the flow follows path 16 about the cell 1. Flow 16 occurs during most rain events and flows through net 7, over weir baffle 2, into cells 1 where ribs $1_A$ create ducts on cell floor $1_B$ and support ceiling $1_C$. As shown in detail on drawing 1, flow 16 turns towards orifice 17 across rib $1_A$, which has been cut to about 25% of its original height The sediment discharge arrows S indicate the logical sinking path of the separated sediment which will collect on bottom 21 as permanently removed sediment 22.

The regular maintenance when using this invention is the inspection of the device for accumulated solids in net 7. Visual inspection of net 7 to check for collected mass or a water level sensor in pipe 8 and chamber 10 that reveals the pressure loss through net 7 remotely indicates the need for a net change out and removal of the solids. The difference between empty water depth and measured distance from sediment level to water level is the sediment depth. Testing will indicate the acceptable depth under operating conditions that will limit wash-out of this collected sediment. During the clean-out event the water column stratifies into three major layers; the oil sheen and fine floatable layer, the water layer and the sediment layer. Upon removal of the net 7 the floatable layer is slurped up by a vacuum hose. The water is decanted and stored temporarily. The sediment is removed though the access openings in the ceiling by trained personnel that use vacuum equipment and spray nozzles to guide the sediment to the vacuum nozzle.

It is to be understood that the form of this invention as shown is merely a preferred embodiment. As defined in the following claims.

For example, multiple sections of cell planking 1 can be placed side by side in addition to being stacked on top of each other.

Having thus described the invention, we claim:

1. A water purifying chamber comprising:
   a first chamber enclosure with a bottom, a top, substantially vertical opposing first and second end walls and substantially vertical opposing first and second sidewalls;
   a water inlet in the first end wall permitting water to flow into the first chamber from a water source;
   a water exit in the second end wall permitting water to flow out of the first chamber, the water exit being no higher than the water inlet;
   a second chamber within a bottom portion of the first chamber where the entire second chamber is accessible from the water inlet across to the water exit;
   an inclined cell separator located between the water inlet and the water exit wherein a top of the cell separator is level with inverts of the water inlet and the water exit and wherein a bottom of the cell separator is adjacent the second chamber to deposit a settled sediment in the water flow on the bottom of the first chamber, the cell separator having a plurality of inclined lamellae plates having first and second ends and top and bottom edges, the top and bottom edges longitudinally extending parallel to the sidewalls and perpendicular to the end walls, the first and second ends of the plurality of lamellae plates being secured to opposing, spaced-apart, substantially vertical weirs, the plurality of lamellae plates being pitched at a fixed angle relative to the substantially vertical sidewalls;

a debris collection net within the first chamber extending over at least a portion of the top of the inclined cell separator whereby water can freely flow through the net and over and down through at least a portion of the inclined cell separator;

the spaced-apart substantially vertical weirs comprising a primary weir and a secondary weir parallel to the end walls and perpendicular to the plurality of lamellae plates, the primary weir having a top edge above the top surface of the inclined cell separator but below a top edge of the secondary weir, the primary and secondary weirs being elevated from the bottom of the primary chamber;

an influent chamber between the first wall and the primary weir;

an effluent chamber between the secondary weir and the second wall; and a hinged baffle below the secondary weir to control water flow below the inclined cell separator and the water flow through the ribbed inclined cell separator.

2. The water purifying chamber of claim 1, further including at least one access opening in the top of the chamber to permit changing the net and cleaning out the sediment from the bottom wall of the first chamber.

3. The water purifying chamber of claim 1, wherein the bottom of the inclined cell separator is given an ascending slope towards the exit pipe to distribute the exiting water in proportion to the incoming water.

4. The water purifying chamber of claim 1, wherein water flow through the inclined cell separator is con-current with suspended sediment flow through the separator to avoid turbulence and re-suspension of sediment.

5. The water purifying chamber of claim 1, wherein the inclined cell separator includes a predetermined number of cells stacked on top of each other with vertical ribs acting as flow water separators inside a cell section to protect sediment from interfering with a flow path of cleansed water flows perpendicular to the ribs at the bottom of the cell separator toward at least one orifice opening.

6. The water purifying chamber of claim 1, wherein the inclined cell separator includes a plurality of parallel overlapping stacked ribbed cells for mixing of cleansed water and settling of suspended sediment wherein two streams of water and suspended sediment encounter gravity induced stratification wherein lighter water flows near a cell ceiling and suspended sediment slides on a cell floor whereby a change in direction of water to flow parallel to the ribbed cells at the bottom of the inclined cell separator to an orifice opening minimally affects continuation of sliding sediment on the cell floor to drop off the bottom of the cell separator to a sediment bed on the bottom of the first chamber.

7. The water purifying chamber of claim 1, wherein the inclined cell separator comprises a predetermined number of individual inclined lamellae or cells stacked together, each cell having a ceiling and a floor with vertical ribs spaced apart across a width of each cell, the ribs acting as flow separators inside each cell and separating settled sediment from being in a flow path of cleansed water that flows perpendicular to the ribs near the ceiling toward an orifice opening and a triangular extension with the ribs provides a continuous path for the settled sediment to slide on the floor of the cell toward a sediment bunker located on the bottom of the first chamber.

8. The water purifying chamber of claim 1, wherein each lamellae plate of the plurality of plates within the separator comprises a plurality of cells formed by spaced apart parallel vertical dividers or ribs, the cells improving full exposure of water flow to the lamellae plate in order to avoid short circuiting of the water flow from an entry to an exit from each cell.

9. The water purifying chamber of claim 8, wherein each cell achieves laminar flow conditions characterized by a Reynolds number on the order of 244 as compared to more turbulent flow conditions of the type characterized by a Reynolds number of 364 for a cell with equal length and equal water flow without ribs.

10. The water purifying chamber of claim 1, wherein storm water or surface water entering the first chamber through the water inlet flows into the net, the net having a cavity for retention of trash solids with openings for trashless passing of the water.

11. The water purifying chamber of claim 10, wherein the net cavity includes a sorption sock or a blanket for absorbing oil sheen from surface waters.

12. The water purifying chamber of claim 1, wherein the source of water is at least one of storm water, surface water and other water discharge.

13. The water purifying chamber of claim 12, wherein the first chamber is generally a box with internal components to receive inflow and outflow of the at least one of storm water, surface water and other water discharge.

14. The water purifying chamber of claim 13, wherein at least one of the sidewalls of the first chamber includes an inflow opening and at least one other of the sidewalls includes an outflow opening with the top having at least one of an inlet grate for a single surface water inlet point and multiple access points to change the net when filled with trash and to remove sediment accumulated on the bottom of the first chamber.

15. The water purifying chamber of claim 13, wherein the first chamber is an inline structure with the water inlet in the first end wall and the water exist in the second end wall are in substantial horizontal and vertical alignment.

16. A liquid purification assembly comprising:

an inclined cell separator having a plurality of rectangular lamellae plates positioned between opposing spaced-apart substantially vertical weirs, the plurality of lamellae plates being substantially parallel to each other and extending substantially perpendicular to the opposing weirs, the lamellae plates having opposing elongated top and bottom edges and an inclined orientation relative a vertical axis, said inclined orientation forming angled cells between adjacent lamellae plates of the plurality, the opposing weirs comprising a primary vertical weir and a secondary vertical weir being substantially parallel to one another, the primary and secondary vertical weirs each having opposing top and bottom edges and front and rear surfaces therebetween;

an influent chamber between the influent wall and the primary vertical weir;

an effluent chamber between the secondary vertical weir and the effluent wall;

a sediment collection area along the bottom of the chamber below the inclined cell separator and between the influent chamber and effluent chamber;

a net extending from the top edge of the primary vertical weir and extending along at least a portion of a top of the inclined cell separator;

a solid hinged baffle suspended below the bottom edge of the secondary vertical weir, the hinged baffle hanging in a substantially vertical position from the secondary vertical weir during periods where liquid is not flowing into the chamber at a flow rate sufficient to produce upward rotation of the baffle, the hinged baffle being rotatable upward during periods where liquid flows into the chamber at a flow rate sufficient to push the hinged baffle towards the effluent wall whereupon the hinged baffle restricts liquid from entering the effluent chamber from the sediment collection area.

17. The assembly of claim 16 where the top edge of the secondary vertical weir is higher than the top edge of the primary vertical weir.

18. The assembly of claim 16 where the bottom edge of the primary vertical weir is elevated from the bottom of the chamber permitting liquid to pass underneath the primary vertical weir from the influent chamber into the sediment collection area below the inclined cell separator.

19. The assembly of claim 16 where the top of the cell separator is substantially horizontally level with inverts of the influent and effluent openings.

20. The assembly of claim 16 where the top edge of the primary vertical weir is higher than the top of the cell separator permitting substances floating on top of liquid in the influent chamber to be trapped in the influent chamber in front of the primary vertical weir.

21. The assembly of claim 16 where the top edge of the secondary vertical weir does not extend to the top of the chamber permitting liquid to flow over the secondary vertical weir from an area above the cell separator into the effluent chamber.

22. The assembly of claim 16 where individual plates of the plurality of plates have substantially identical dimensions.

23. The assembly of claim 16 where the hinged baffle has a plurality of orifices therein, the orifices permitting the flow of liquid through the hinged baffle into the effluent chamber.

* * * * *